(12) United States Patent
Komer et al.

(10) Patent No.: US 8,959,435 B2
(45) Date of Patent: Feb. 17, 2015

(54) SYSTEM AND METHODS FOR DETECTING DEBRIS ON A TOUCHSCREEN SYSTEM DISPLAY SCREEN

(75) Inventors: Joseph L. Komer, Shawnee, KS (US); Ted D. Mabie, Olathe, KS (US); David M. Dixon, Overland Park, KS (US); Clayton C. Vondrasek, Lenexa, KS (US)

(73) Assignee: Garmin Switzerland GmbH (CH)

( * ) Notice: Subject to any disclaimer, the term of this patent is extended or adjusted under 35 U.S.C. 154(b) by 803 days.

(21) Appl. No.: 13/215,752

(22) Filed: Aug. 23, 2011

(65) Prior Publication Data

US 2013/0055080 A1    Feb. 28, 2013

(51) Int. Cl.
*G06F 3/00* (2006.01)
*G06F 3/041* (2006.01)
*G06F 3/042* (2006.01)

(52) U.S. Cl.
CPC ............ *G06F 3/0418* (2013.01); *G06F 3/0421* (2013.01)
USPC ............ 715/702; 345/173; 345/174; 345/175

(58) Field of Classification Search
USPC .................................. 715/702; 345/173–175
See application file for complete search history.

(56) References Cited

U.S. PATENT DOCUMENTS

| | | | |
|---|---|---|---|
| 4,812,642 A * | 3/1989 | Hasegawa et al. ............. | 250/221 |
| 4,855,590 A | 8/1989 | Bures et al. .................... | 250/221 |
| 6,429,857 B1 | 8/2002 | Masters et al. ................ | 345/175 |
| 6,677,934 B1 | 1/2004 | Blanchard ...................... | 345/175 |
| 2002/0080046 A1* | 6/2002 | Derringer ...................... | 340/945 |
| 2003/0006973 A1* | 1/2003 | Omura et al. ................. | 345/175 |
| 2009/0052737 A1* | 2/2009 | Lycett ........................... | 382/103 |
| 2009/0153709 A1* | 6/2009 | Kanzaki et al. ............... | 348/294 |
| 2009/0189878 A1* | 7/2009 | Goertz et al. ................. | 345/175 |
| 2011/0084939 A1* | 4/2011 | Gepner et al. ................ | 345/175 |
| 2011/0115720 A1 | 5/2011 | Klein et al. ................... | 345/173 |
| 2012/0105358 A1* | 5/2012 | Momeyer et al. ............. | 345/174 |
| 2013/0208164 A1* | 8/2013 | Cazier et al. ............. | 348/333.04 |

OTHER PUBLICATIONS

U.S. Appl. No. 12/477,280 entitled Avionics Control and Display Unit filed Jun. 3, 2009.

\* cited by examiner

*Primary Examiner* — Tadeese Hailu
*Assistant Examiner* — Andrew Chung
(74) *Attorney, Agent, or Firm* — Samuel M. Korte; Mohammad M. Ali

(57) ABSTRACT

Touchscreen electronics for detecting debris on a display screen of a touchscreen system and alerting a user to the presence of the debris broadly comprises a plurality of transmitters, a plurality of receivers, and a controller. Each transmitter may transmit at least one beam across the display screen. The receivers may detect the beams from the transmitters, and each receiver may generate a receive signal. The controller communicates with the transmitters and the receivers and may be configured to analyze the receive signals to determine if debris may be present on the display screen. If so, then the controller may generate an alert signal to indicate that the display screen needs to be cleaned or examined.

33 Claims, 9 Drawing Sheets

SYSTEM AND METHODS FOR DETECTING DEBRIS ON A TOUCHSCREEN SYSTEM DISPLAY SCREEN

BACKGROUND

Embodiments of the present technology relate to touchscreen systems that utilize optoelectronic devices to detect touches on a display screen. Touchscreen systems typically include a display screen that presents information to a user and touchscreen electronics for detecting touches on the display screen. The touchscreen system may be attached to or otherwise coupled with an electronic device that performs various functions and controls the information displayed on the display screen. The user may respond to questions, enter data, or otherwise operate the electronic device by touching or physically contacting a portion of the display screen.

SUMMARY

Fingerprints, dust, and other debris can accumulate on touchscreen systems with display screens and interfere with their operation. Embodiments of the present technology provide touchscreen electronics for detecting debris on a display screen of a touchscreen system and alerting a user to the presence of the debris. An embodiment of the touchscreen electronics broadly comprises a plurality of transmitters, a plurality of receivers, and a controller. Each transmitter may transmit at least one beam across the display screen. The receivers may detect the beams from the transmitters, and one or more of the receivers may generate a receive signal. The controller communicates with the transmitters and the receivers and may be configured to analyze a status of the receive signals to detect a possible presence of debris on the display screen. The controller may determine a location on the display screen corresponding to the detected debris and generate an alert signal if the receive signals suggest the presence of debris on the display screen. The controller may further control the display screen to visually instruct a user to clean the location of the display screen corresponding to the detected debris.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
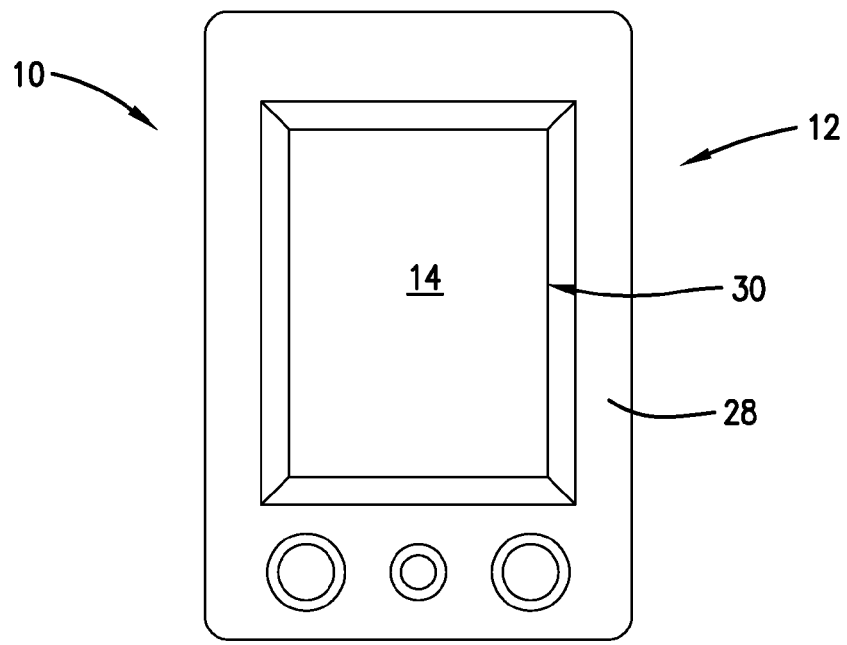
FIG. 1 is a top view of an electronic device in which the touchscreen electronics of the present technology may be implemented.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide touchscreen electronics for detecting debris on a display screen of a touchscreen system and alerting a user to the presence of the debris. An embodiment of the touchscreen electronics broadly comprises a plurality of transmitters, a plurality of receivers, and a controller.

Each of the transmitters may be configured to transmit a beam across the display screen. In various embodiments, the transmitters may be configured to transmit and the receivers may be configured to receive infrared (IR) wavelength beams. In some embodiments, the transmitters are placed along all sides of the display screen. The receivers may be placed along the sides of the display screen, generally interleaved with the transmitters, such that one receiver is positioned between two transmitters. However, the receivers and transmitters may be positioned in any configuration.

During operation, each transmitter transmits a beam that is received by one or more of the receivers. Thus, a pattern of crisscrossing beams is created close to the surface of the display screen. When a user touches the display screen, a portion of the beams is broken. As a result, the receivers on one or more sides of the display screen no longer receive the transmitted signals. The touchscreen electronics may use the location of the inactive receivers to determine the coordinates of the point of display screen contact. The accuracy of the touchscreen system may be related to the difference between the point on the display screen where the user actually touched and the point on the display screen where the touchscreen electronics determined that the user touched. Generally, a smaller difference corresponds to greater accuracy, and a larger difference corresponds to lower accuracy. The difference may also be known as a touch error and may be indicated by a physical distance, such as 2 millimeters (mm), 5 mm, or any other distance.

The touchscreen system may be utilized in a variety of environments and thus may encounter various situational environments. For example, in a marine environment, the touchscreen system may be exposed to steam, mist, or water spray. In colder environments, condensation or frost may form on the display screen. In any environment, the touchscreen system may encounter smoke or liquid spills, while debris, dust, dirt, sand, or other objects may collect on the display screen. All of these factors may block one or more beams from being received by the receivers, thus creating broken beams. If a beam is broken for more than a certain time period, then the beam is a "stuck" broken beam. Defining a minimum time period likely distinguishes a stuck broken beam from a valid user touch. An exemplary minimum time period may be approximately 5 seconds, since a user touch typically lasts less than 5 seconds.

Stuck broken beams affect the accuracy of the touchscreen system, generally by increasing the touch error. Within a physical system, a small amount of error is acceptable. However, as the touch error increases, the touchscreen system may no longer be able to detect touches accurately. For example, touches may result in erroneous selections or may not be detected at all. When the touch error increases beyond a certain level, the touchscreen system may generate an alert signal to alert the system operator, such as an aircraft pilot. The alert may indicate where on the display screen foreign object may be located. The alert may additionally or alternatively indicate degraded touchscreen resolution because of detected debris. The system operator may then clean the display screen or otherwise remove the objects or debris that are blocking the beams.

Figure 6:
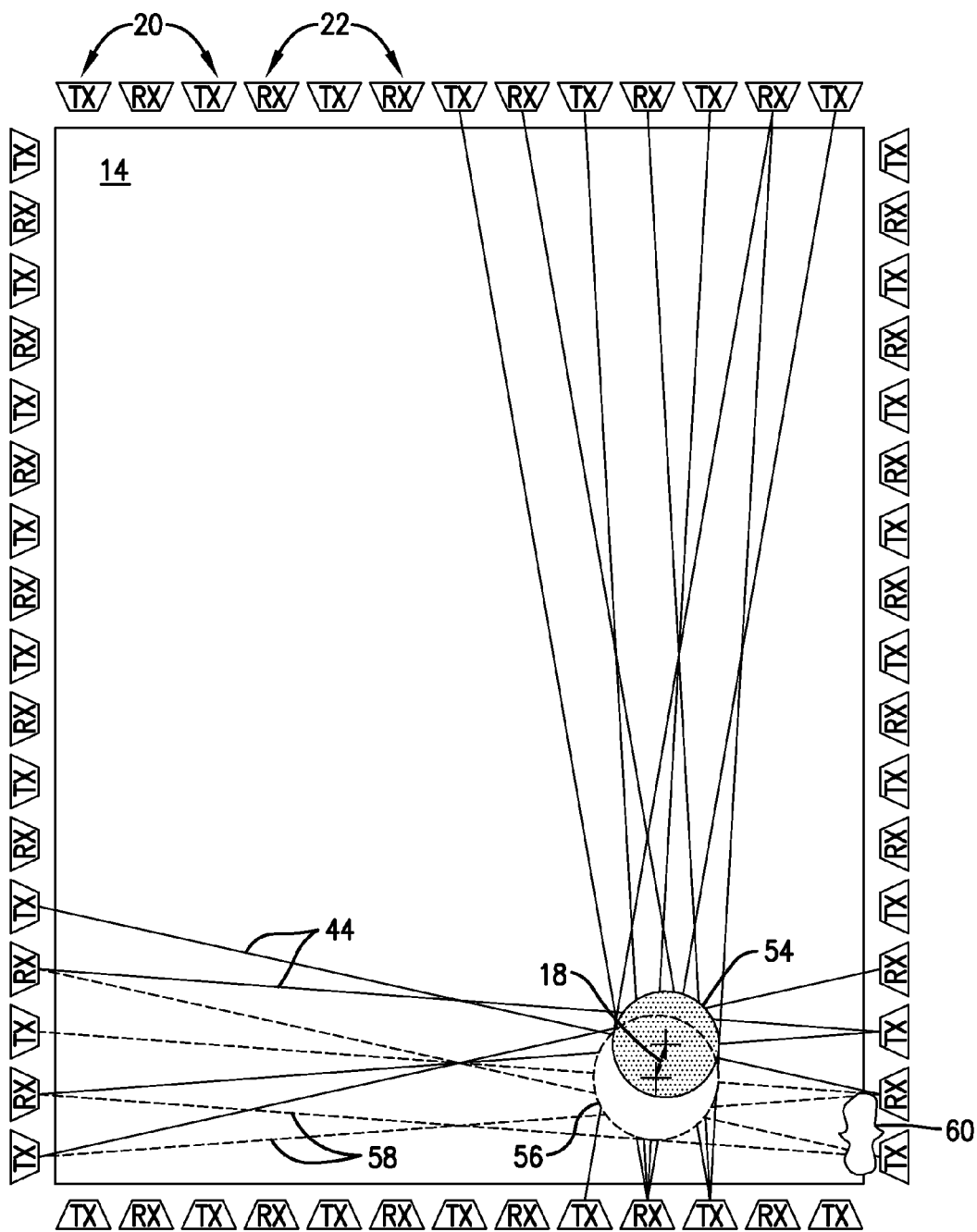
FIG. 6 is a schematic view of the display screen, the transmitters, and the receivers depicting a difference between an actual touch and a touch determined by the touchscreen electronics in the presence of a plurality of stuck broken beams.
Figure 7:
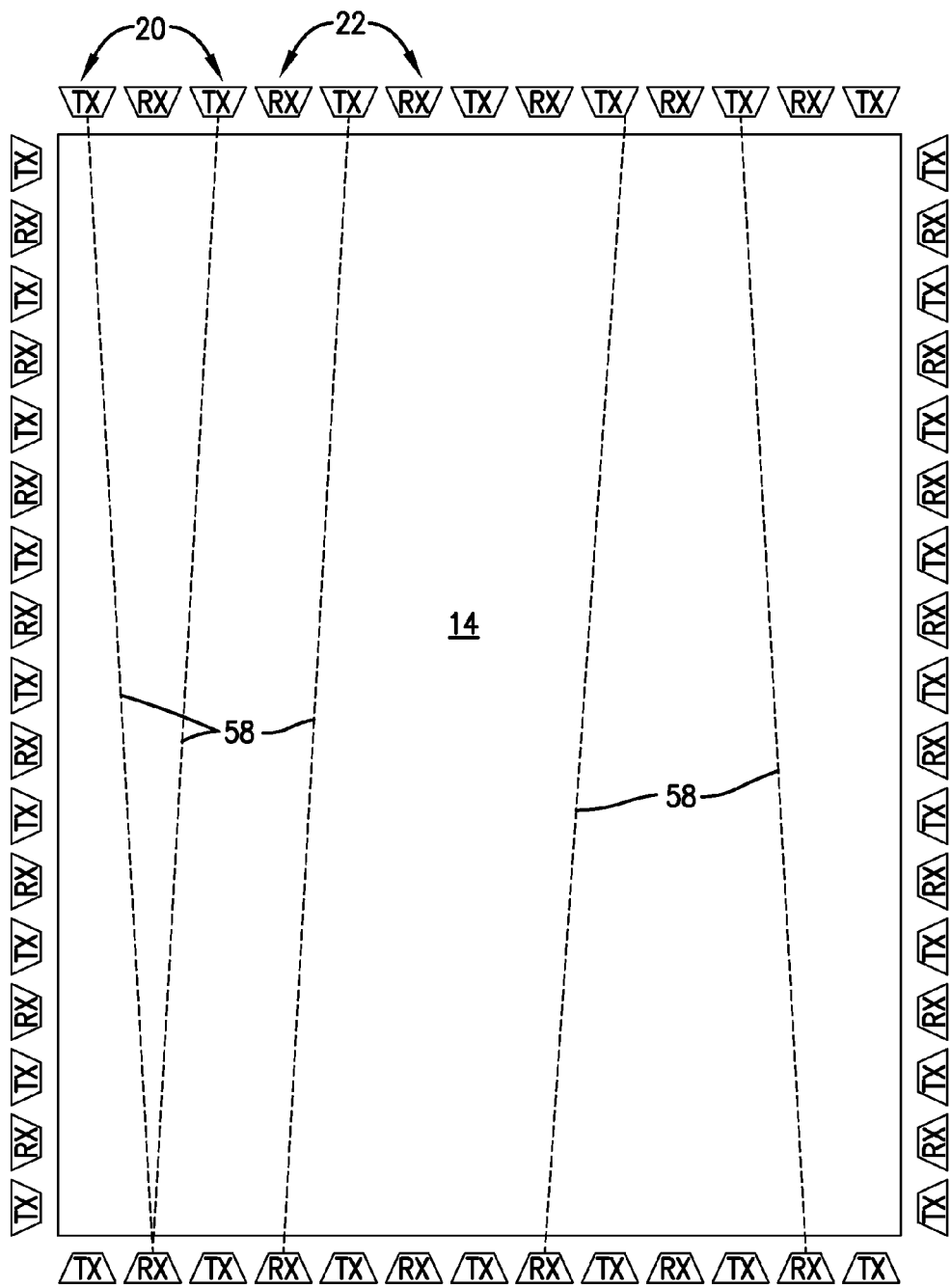
FIG. 7 is a schematic view of the display screen, the transmitters, and the receivers depicting a first pattern of stuck broken beams for determining a first touch error value.
Figure 8:
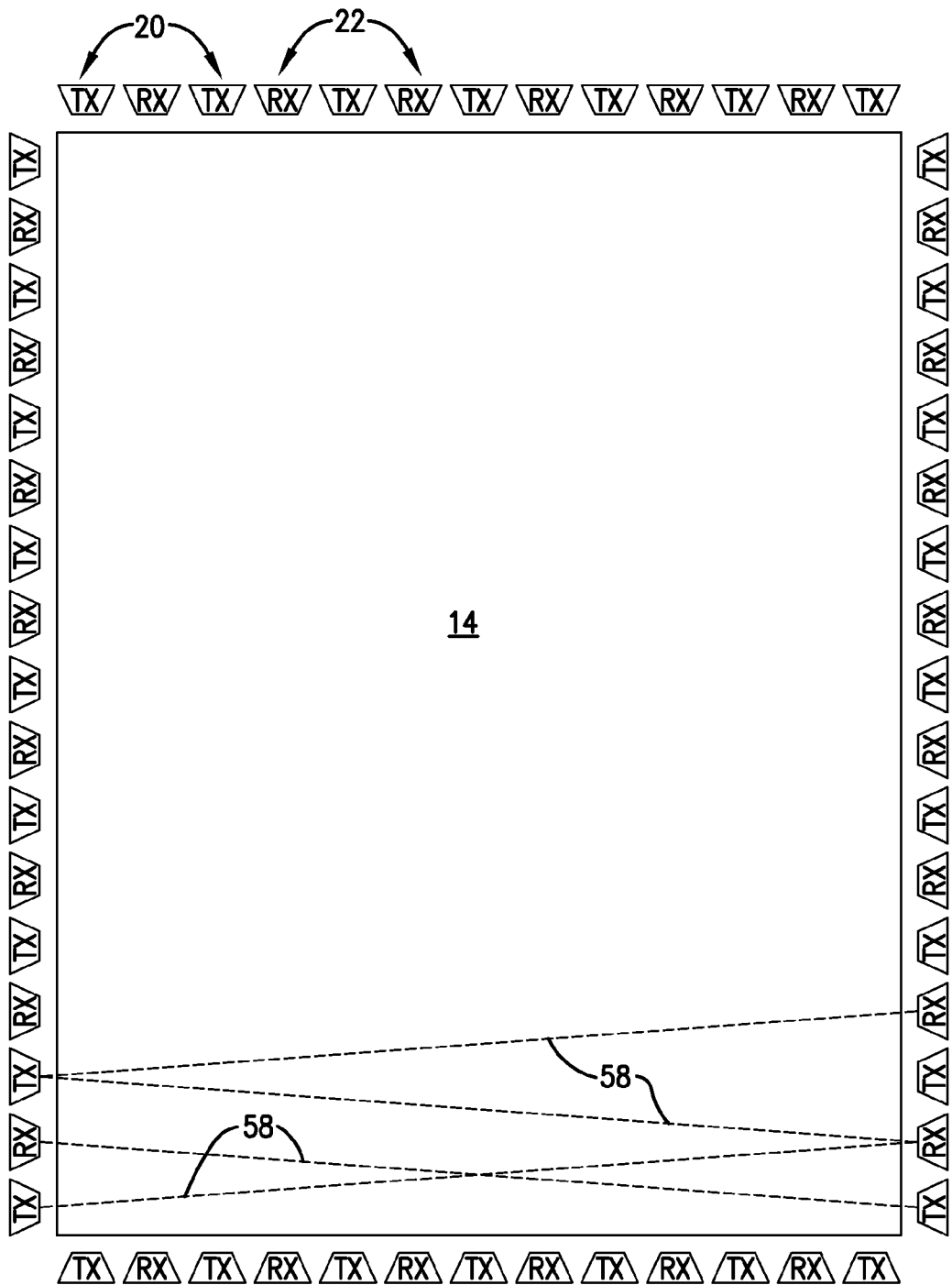
FIG. 8 is a schematic view of the display screen, the transmitters, and the receivers depicting a second pattern of stuck broken beams for determining a second touch error value.
Figure 9:
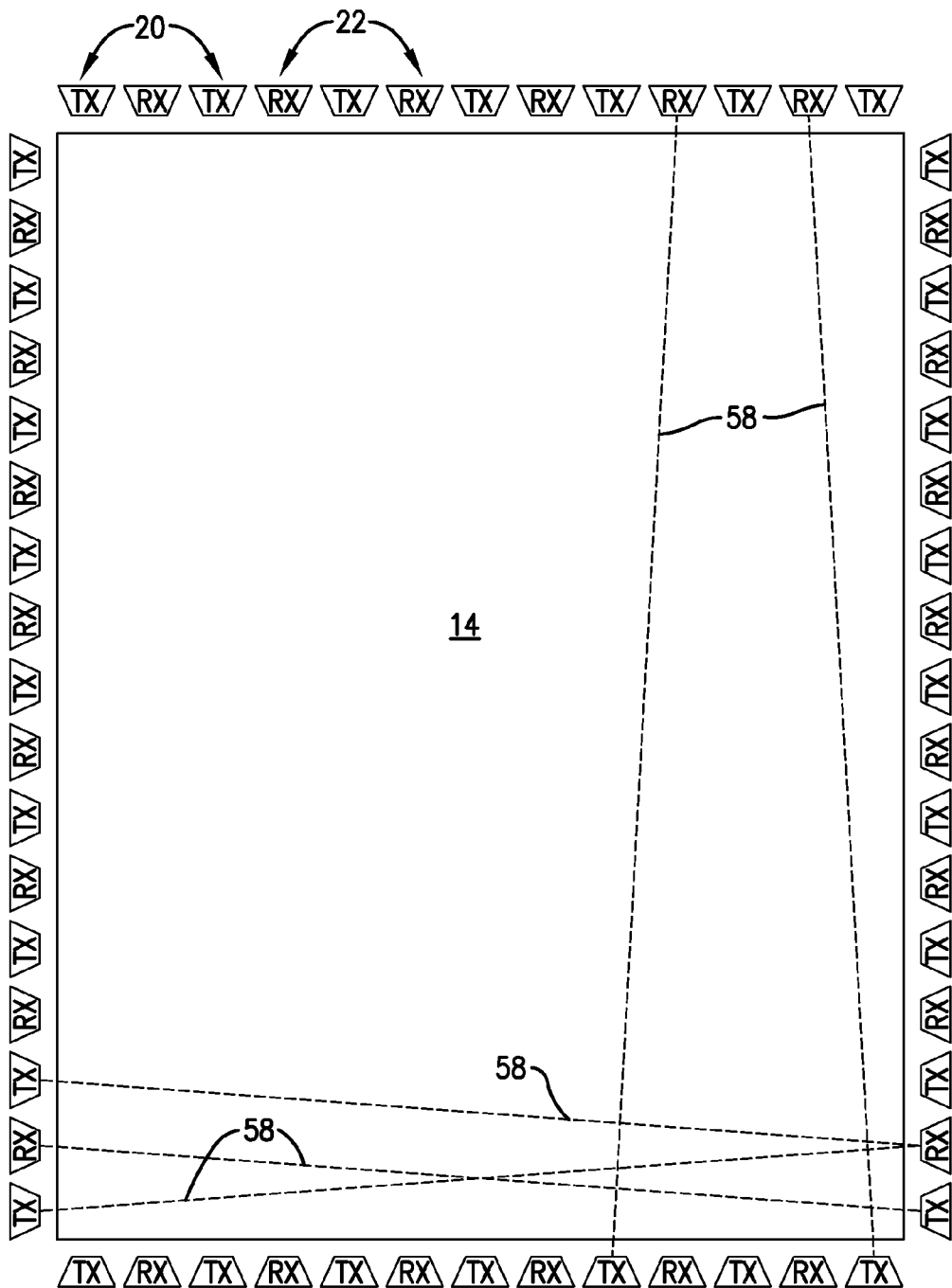
FIG. 9 is a schematic view of the display screen, the transmitters, and the receivers depicting a third pattern of stuck broken beams for determining the second touch error value.

Embodiments of the technology will now be described in more detail with reference to the drawing figures. Referring initially to FIG. 1, an electronic device 10 in which the touchscreen system 12 of the present technology may be integrated is illustrated. Embodiments of the touchscreen system 12 may comprise a display screen 14 and touchscreen electronics 16 for detecting debris on a display screen of a touchscreen system and alerting a user to the presence of the debris. The touchscreen electronics 16 may also be used for determining a touch error 18, as shown in FIG. 6. As described in more detail below, the touchscreen electronics 16 may broadly comprise a plurality of transmitters 20, a plurality of receivers 22, and a controller 24, as seen in FIG. 4.

The electronic device 10 may be any device that presents visual information to a user and with which the user may interact. Examples of the electronic device 10 include commercial, retail, or public information kiosks located in banks, shopping malls, airports, and the like, computing devices such as a desktop computer or a laptop computer, medical test or diagnostic equipment used in a hospital or laboratory, navigation and instrumentation equipment used in an aircraft, marine vessel, or automobile, and similar electronic components.

The electronic device 10 may include components not necessarily shown in the figures, such as inputs, outputs, and communication ports. Inputs may include knobs, dials, switches, keypads, keyboards, mice, joysticks, combinations thereof, and the like. Outputs may include audio speakers, lights, dials, meters, printers, combinations thereof, and the like. Communication ports may be wired or wireless, electronic, optical, radio frequency (RF), combinations thereof, and the like.

Figure 4:
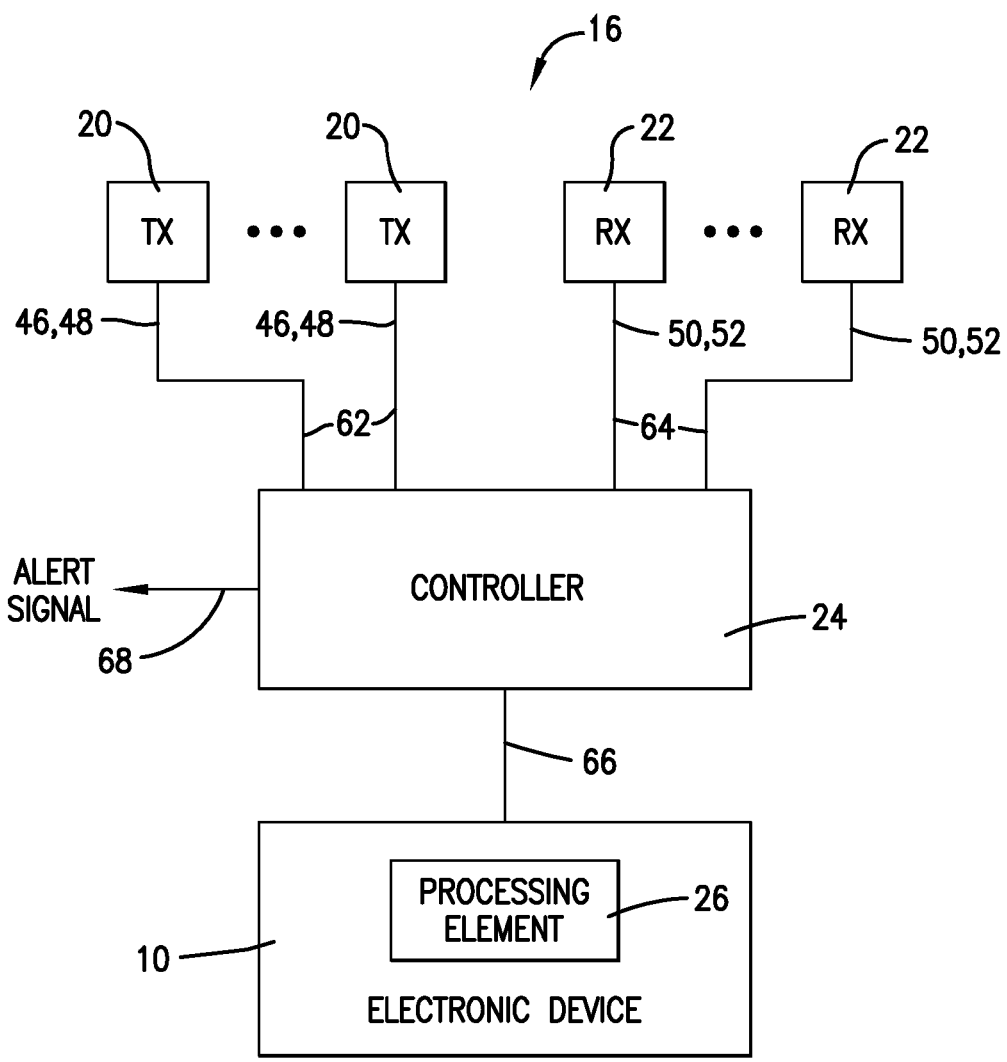
FIG. 4 is a block diagram of the electronic device and the touchscreen electronics in accordance with various embodiments of the present technology.

As shown in FIG. 4, embodiments of the electronic device 10 may also include a processing element 26 that performs logical functions and controls the information and data that are displayed on the display screen 14. The information and data displayed may depend on computer programs, software, or code that is executed by the electronic device 10, input from users utilizing the inputs discussed above, input from the touchscreen electronics 16 of the current technology generated from users touching the display screen 14, and combinations thereof. The processing element 26 may include processors, microprocessors, microcontrollers, or similar components that are capable of executing computer programs, software, or code. The processing element 26 may further include data storage components such as read-only memory (ROM), random-access memory (RAM), hard-disk drives, optical disk drives, flash memory drives, combinations thereof, and the like.

Figure 2:
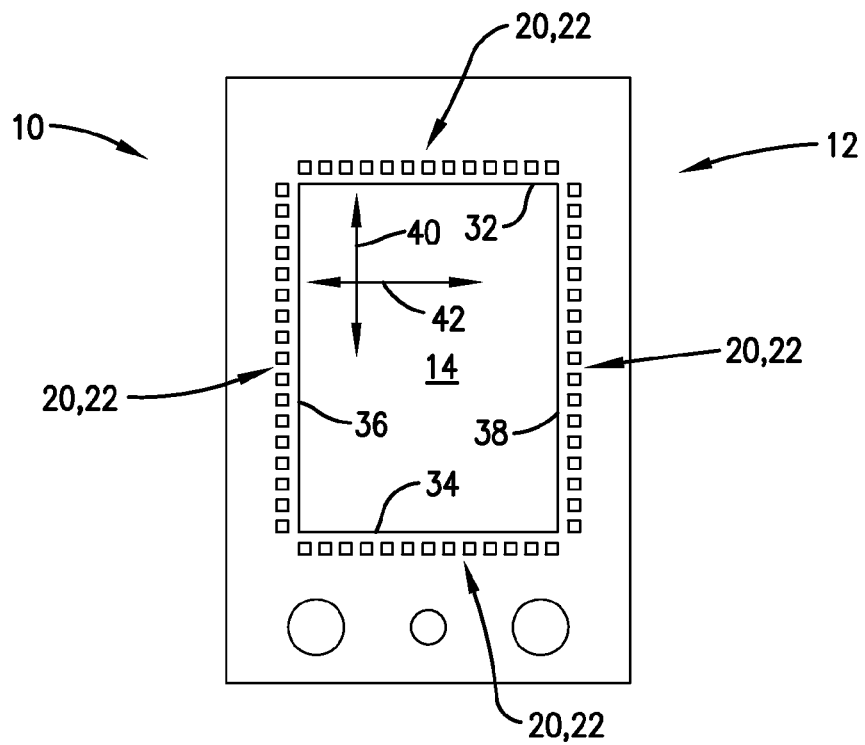
FIG. 2 is a top view of the electronic device with a front cover removed to show the transmitters and receivers of the touchscreen electronics positioned adjacent to the edges of a display screen.
Figure 3:
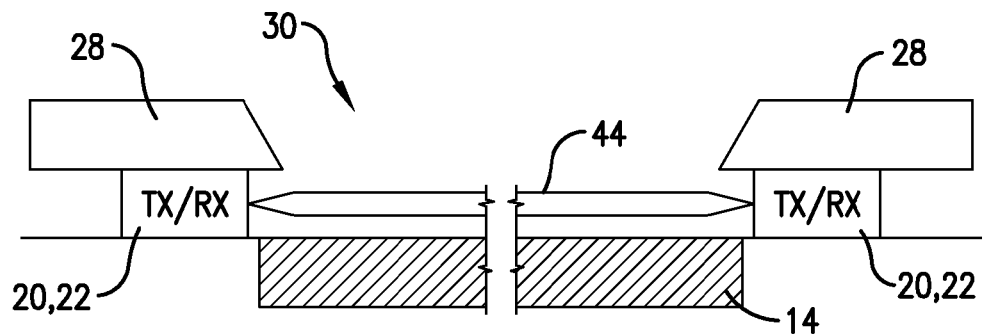
FIG. 3 is a schematic sectional view of the touchscreen system showing the transmitters and receivers positioned at the edge of the display screen and underneath the front cover of the electronic device.

The electronic device 10 may further include a cover 28 that is shown in FIG. 1, but is removed in FIG. 2 to reveal the transmitters 20 and the receivers 22. The cover 28 generally provides protection for the transmitters 20, the receivers 22, the display screen 14, and any other components in the vicinity thereof. In some embodiments, the cover 28 may include or form a bezel. The cover 28 may have a shape that conforms to a housing or a body of the electronic device 10 to which the cover 28 may be attached. The cover 28 may include a window 30 or opening that aligns with the display screen 14. The window 30 may have a similar size and aspect ratio as the display screen 14. In order to accommodate the operation of the transmitters 20 and the receivers 22, the cover 28 may be shaped so that the window 30 does not contact the display screen 14 and allows some space therebetween. In some embodiments, the space between the window 30 and the display screen 14 may be empty. In other embodiments, a transparent gasket or seal may be placed between the window 30 and the display screen 14. Furthermore, when the touchscreen system 12 is finally assembled, the cover 28 may be positioned over the transmitters 20 and the receivers 22, as seen in FIG. 3. Accordingly, the user may not be able to see or access the transmitters 20 and the receivers 22.

The display screen 14 may display information or data encouraging the user to interact with the electronic device 10. The information may include questions or statements that prompt the user to touch the display screen 14. The information may also include on-screen keyboards, numeric or alphanumeric keypads, menuing systems, popup windows, and the like. Thus, the user may touch the display screen 14 to respond to prompts or questions, type text, enter numbers, activate menus, open windows or dialog boxes, scroll through lists, or similar activities. Thus, the electronic device 10 may be controlled by or may operate in response to touches on the display screen 14.

The display screen 14 may be of a variety of types, including, but not limited to, a cathode ray tube (CRT), plasma, light-emitting diode (LED), organic LED (OLED), LEP (Light Emitting Polymer) or PLED (Polymer LED), liquid crystal display (LCD), thin film transistor (TFT) LCD, LED side-lit or back-lit LCD, combinations thereof, and the like. In various embodiments, the display screen 14 may be integral with the electronic device 10, as shown in FIGS. 2-3 and exemplified by a device such as a multi-use avionics-system controller. In other embodiments, the display screen 14 may be separate from the electronic device 10, such as with a computer monitor or other video monitor.

The display screen 14 is generally flat to accommodate the operation of the touchscreen electronics 16, as discussed in more detail below. The display screen 14 may have multiple sides but is typically four-sided with a top side 32, a bottom side 34, a left side 36, and a right side 38. The display screen 14 may possess a square or a rectangular aspect ratio and may be viewed in either a landscape or a portrait mode. Furthermore, the display screen 14 may include a first axis 40 and a second axis 42. The first axis 40 may be either horizontal or vertical and may be oriented parallel to one of the sides 32, 34, 36, 38. The second axis 42 may be either horizontal or vertical but generally orthogonal to the first axis 40 and may be oriented parallel to an orthogonal one of the sides 32, 34, 36, 38.

Figure 5:
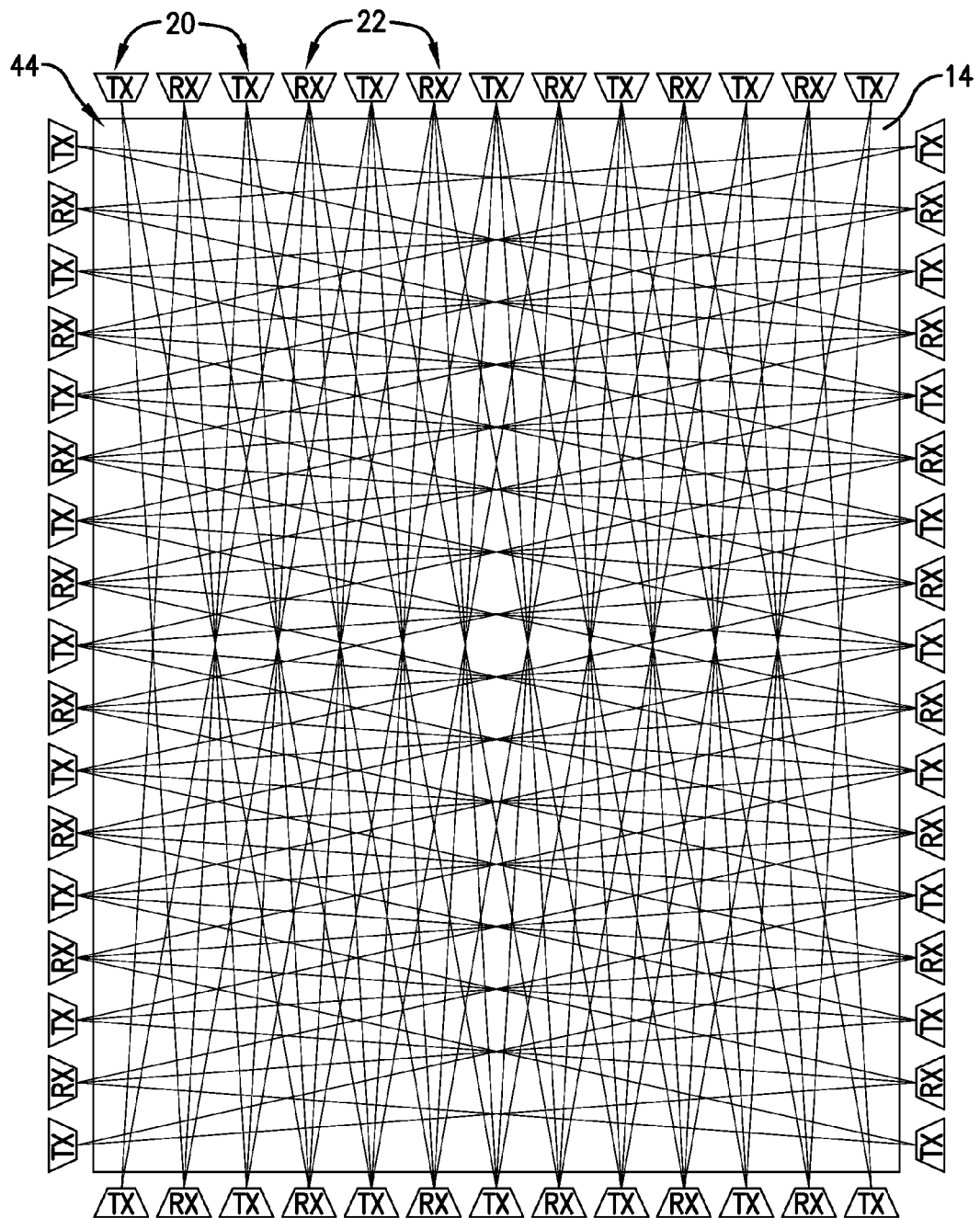
FIG. 5 is a schematic view of the display screen, the transmitters, and the receivers depicting a beam pattern created by the touchscreen electronics.

The transmitters 20, also designated as "TX", and the receivers 22, also designated as "RX", may be positioned along one or more sides of the perimeter of the display screen 14 as seen in FIGS. 2 and 5-10 such that the transmitters 20 may transmit beams 44 across the display screen 14 to the receivers 22, as shown in FIGS. 3 and 5. Typically, the transmitters 20 and the receivers 22 are placed such that they are adjacent to the entire perimeter of the display screen 14. Accordingly, the number of transmitters 20 and receivers 22 may depend on the size of the perimeter, the size of each transmitter 20 and receiver 22, and the space between each device. Other factors may influence the number of transmitters 20 and receivers 22, such as minimizing power consumption of the touchscreen system 12, in which case the number of transmitter 20 and receivers 22 may be reduced.

The transmitters 20 and the receivers 22 may be placed with the transmitters 20 being interleaved with the receivers 22, such that one receiver 22 is positioned between two transmitters 20 and vice versa. The beam 44 from the transmitter 20 may have a conical shape in general or a triangular shape when viewed in a plane. Thus, the beam 44 from one transmitter 20 may reach several receivers 22 on the other side of the display screen 14. As a result, several beams 44 may be formed between one transmitter 20 and the receivers 22 on the opposing side. For example, as seen in FIG. 5, one beam 44 may be formed between one transmitter 20 and each of four receivers 22 to produce a total of four beams 44, although this number may decrease near the corners of the display screen 14. Furthermore, each receiver 22 may receive a beam 44 from multiple transmitters 20. Hence, there may be multiple beams 44 that lead to one receiver 22. For example, as seen in FIG. 5, each receiver 22 may receive four beams 44, except in the vicinity of the corners of the display screen 14 where the number of beams 44 per receiver 22 decreases.

In various embodiments, the transmitters 20 may be positioned along one side of the display screen 14 substantially linearly aligned with the transmitters 20 along the opposite side of the display screen 14. Likewise, the receivers 22 may be substantially linearly aligned with receivers 22 along opposing sides of the display screen 14. This orientation may produce the pattern of beams 44 shown in FIG. 5. However, the touchscreen electronics 16 may function properly with other orientations and configurations of transmitters 20 and receivers 22, including non-interleaved configurations, which, along with the resultant pattern of beams 44, are within the scope of the current technology.

Each of the transmitters 20 generally transmits a beam 44 that corresponds to a transmit signal 46 from the controller 24. The transmit signal 46 may be received by a transmitter input 48. Each transmitter 20 may receive the transmit signal 46, either as a voltage or a current, from the controller 24 and generate the corresponding beam 44 with an intensity that is proportional to the magnitude of the transmit signal 46—typically in the infrared (IR) wavelength range of approximately 700 nanometers (nm) to approximately 1500 nm. The beam 44 may be considered to be an optical transmission and thus the transmitter 20 may include light-emitting diodes (LEDs), surface-emitting or edge-emitting lasers, similar optoelectronic devices, or combinations thereof.

The transmit signal 46 from the controller 24 and the corresponding beam 44 may be generated at a constant level or a varying level, wherein the beam 44 is turned on and off in a pattern. The important function for the transmitter 20 is to produce a beam 44 that is capable of being interrupted or broken.

One or more of the receivers 22 may produce a receive signal 50 that is communicated through a receiver output 52 and corresponds to radiation detected by a sensing surface of the receiver 22. The receiver 22 may include photodetectors, photocells, phototransistors, photoresistors, photodiodes, other photosensitive materials that may detect IR radiation, or combinations thereof. The receiver 22 may produce the receive signal 50 as an analog electrical or electronic output, either voltage or current, that corresponds to the detected radiation.

The receive signal 50 may generally correspond to or somewhat resemble the transmit signal 46 while the beam 44 is unbroken and received by the receiver 22. Thus, the receive signal 50 may indicate when the beam 44 is broken and not received by the receiver 22.

The touch error 18 is represented in FIG. 6. A user's actual touch 56 and a determined touch 54, whose location is calculated by the controller 24, are both shown as circles. A plurality of beams 44 that are broken by the actual touch 56 are shown as solid lines. A plurality of stuck broken beams 58 created by a physical object 60, such as debris, condensation, frost, or the like, are shown as dashed lines. The actual touch 56 is created by the user's contact. The determined touch 54 is created by the user's contact and the physical object 60, which leads to the controller 24 calculating the center of the determined touch 54 at a distance away from the center of the actual touch 56. The distance between the center of the actual touch 56 and the center of the determined touch 54 is the touch error 18.

The controller 24 may include digital to analog converters (DACs), analog to digital converters (ADCs), signal amplifiers, drivers, similar electrical or electronic circuits, or combinations thereof. The controller 24 generally sends the transmit signal 46 to the transmitters 20 and receives the receive signal 50 from the receivers 22. Accordingly, the controller 24 may include a plurality of outputs 62 that are coupled to the transmitter inputs 48 and a plurality of inputs 64 that are coupled to the receiver outputs 52. The transmit signal 46 and the receive signal 50 may include a variable analog voltage or current level.

The controller 24 may also include a data output 66 to send information to the electronic device 10, such as the location on the display screen 14 where a touch occurred. In order to determine the location of a touch and perform other functions, the controller 24 may execute computer programs, software, code, instructions, algorithms, or firmware, and combinations thereof. The controller 24 may include circuitry, such as finite state machines (FSMs), that automatically performs instructions. The controller 24 may also include processors, microprocessors, microcontrollers, field-programmable gate arrays (FPGAs), application-specific integrated circuits (ASICs), combinations thereof, and the like, and may be implemented using hardware description languages (HDLs), such as Verilog and VHDL. The controller 24 may further include data storage components such as read-only memory (ROM), random-access memory (RAM), hard-disk drives, optical disk drives, flash memory drives, combinations thereof, and the like. In addition, the controller 24 may include communication ports to allow for programming or other miscellaneous functions.

During operation, the controller 24 may store the number of stuck broken beams 58, along with their location. Specifically, the controller 24 may determine variable factors, such as the side 32, 34, 36, 38 and the axis 40, 42 along which the receivers 22 of the stuck broken beams 58 are located. The variable factors may have an effect on the touch error 18. For example, the touch error 18 may be determined by the number of stuck broken beams 58 along the first axis 40 and the second axis 42, and whether at least a portion of the stuck broken beams 58 are along opposing sides 32, 34, 36, 38. However, in general, the touch error 18 may be affected by additional factors that are constant for a given touchscreen system 12, such as the size of the display screen 14, the aspect ratio of the display screen 14, the number and spacing of the transmitters 20 and the receivers 22, and the like. For one or more touch error 18 values with a given touchscreen system 12, the variable factors, such as the number of stuck broken beams 58 along the first axis 40 and the second axis 42, and whether at least a portion of the stuck broken beams 58 are along opposing sides 32, 34, 36, 38, may be determined empirically or by simulation and programmed or stored in the controller 24. The controller 24 may check for the variable factors for a certain touch error 18 value, and if the factors are met then the touch error 18 may be at least that touch error 18 value. If the variable factors are not met, then the touch error 18 is less than the touch error 18 value. The variable factors, in an exemplary touchscreen system 12, for a few different touch error 18 values are discussed below. However, touch errors 18 utilized by embodiments of the present invention may comprise any values, including static, predefined, dynamic, and user-determined values.

In one example, a touch error 18 of approximately 5 mm may be indicated by at least five stuck broken beams 58 along one of the axes 40, 42, wherein all of the stuck broken beams 58 are along the same side 32, 34, 36, 38. As an example shown in FIG. 7, five stuck broken beams 58 determined from receivers 22 along the bottom side 34 of the display screen 14 may indicate a touch error 18 of approximately 5 mm.

In another example, a touch error 18 of approximately 4 mm may be indicated by at least four stuck broken beams 58 along one of the axes 40, 42 and at least one stuck broken beam 58 is on an opposing side 32, 34, 36, 38. As a first example shown in FIG. 8, three stuck broken beams 58 determined from receivers 22 along the right side 38 of the display screen 14 and one stuck broken beam 58 determined from a receiver 22 along the left side 36 may indicate a touch error 18 of approximately 4 mm. In addition, a touch error 18 of approximately 4 mm may also be indicated by at least three stuck broken beams 58 along the first axis 40, wherein at least one of the three is from an opposing side 32, 34, 36, 38, and at least two stuck broken beams 58 along the second axis 42. As a second example shown in FIG. 9, two stuck broken beams 58 determined from receivers 22 along the right side 38 of the display screen 14, one stuck broken beam 58 determined from a receiver 22 along the left side 36, and two stuck broken beams 58 along the top side 32 may indicate a touch error 18 of approximately 4 mm.

Figure 10:
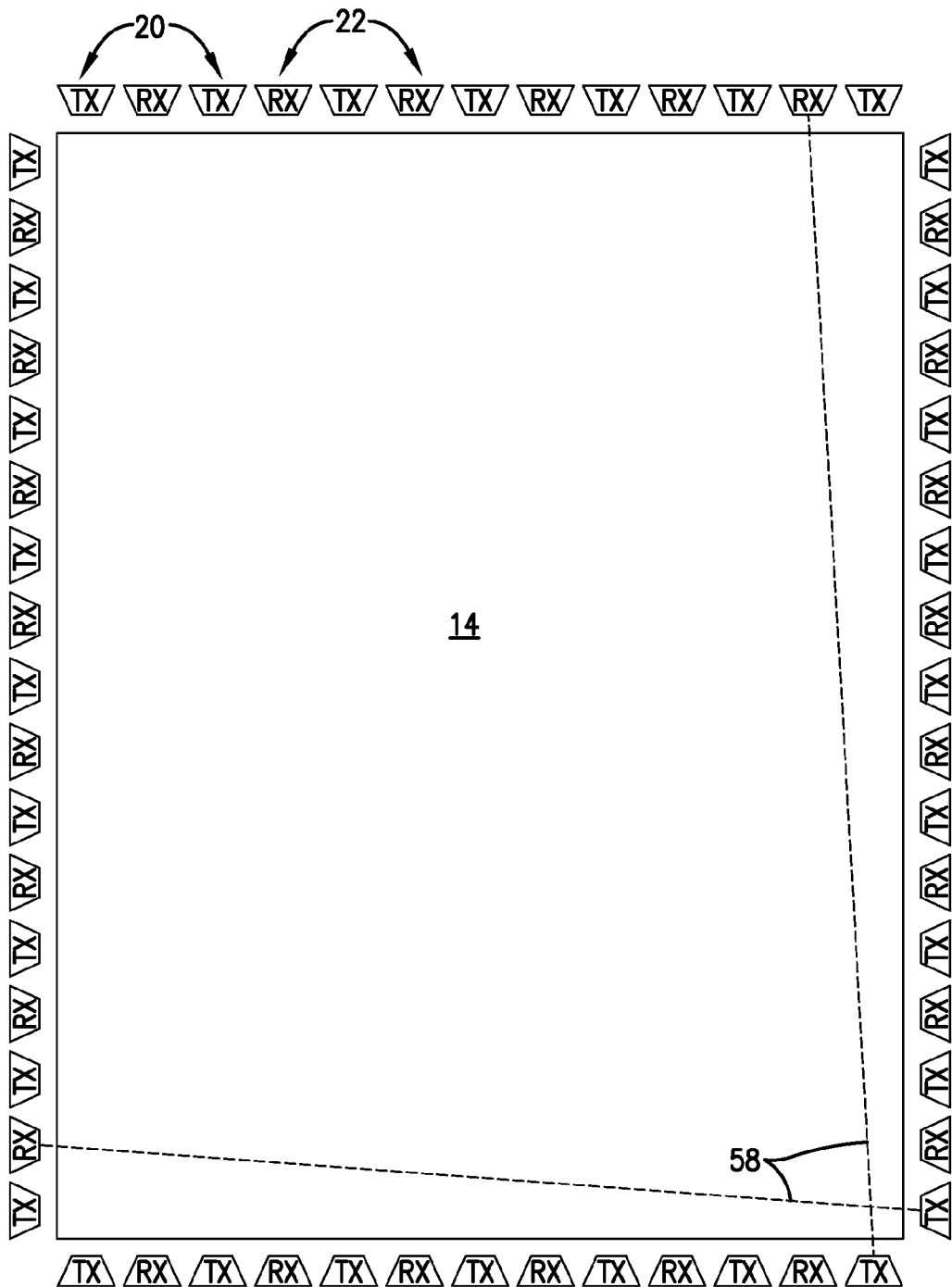
FIG. 10 is a schematic view of the display screen, the transmitters, and the receivers depicting a fourth pattern of stuck broken beams for determining a third touch error value.

In another example, a touch error 18 of approximately 3 mm may be indicated by two stuck broken beams 58 along the same or different axes 40, 42 or along the same or different sides 32, 34, 36, 38. Thus, as shown in FIG. 10, any two stuck broken beams 58 may indicate a touch error 18 of approximately 3 mm.

Furthermore, the controller 24 may be programmed to generate an alert signal 68 if the controller 24 determines that the conditions for the touch error 18 have been met. The alert signal 68 may generally indicate that the display screen 14 needs to be cleaned, or at least examined, and may include a flashing light or a prompt on the display screen 14, a message sent to an external monitor, an audio alert, or the like, and combinations thereof. The alert signal 68 may additionally or alternatively indicate degraded touchscreen resolution because of the detected debris.

In various embodiments, the controller 24 may determine the coordinates or position on the display screen 14 in which the debris is located. The position of the debris may be the location at which the stuck broken beams 58 intersect or overlap. Or, if the stuck broken beams 58 do not intersect, then the position of the debris may be the location at which the stuck broken beams 58 are closest together. The controller 24 may control the display screen 14, or at least a portion of the display screen 14, to indicate the position on the display screen 14 where the debris, condensation, or frost may be located. The controller 24 may display a box or a circle on the display screen 14 where the display screen 14 should be cleaned. The display screen 14 may highlight the area to be cleaned by the user or otherwise display information directing the user's attention to the impacted area.

The value of the touch error 18 for which the controller 24 issues an alert may be set by the manufacturer before the touchscreen system 12 is in use, or, in some embodiments, by the user while the touchscreen system 12 is operating. Different values of touch errors may be required or acceptable in different situations. For example, a touchscreen system 12 implemented in an aircraft cockpit may have the need to alert the user, such as a pilot, if the touch error 18 is approximately 3 mm. Alternatively, a touchscreen system 12 implemented in an information kiosk may have less critical needs and may alert a monitoring office if the touch error 18 is determined to be approximately 5 mm.

The touchscreen system 12 may function as follows. Variable factors for determining the touch error 18, such as the exemplary variable factors discussed above for touch errors of 3 mm, 4 mm, and 5 mm, are programmed into the controller 24. In addition, the value of the touch error 18 may be set before use or during use by the manufacturer or by the user. The values of touch errors 18 may also correspond to the size or amount of debris on the display screen 14 that can be tolerated by the touchscreen system 12. For example, larger values of touch errors 18 may allow larger sized particles or a greater amount of smaller particles to be present without generating the alert signal 68. Alternatively, smaller values of touch errors 18 may lead to the touchscreen system 12 prompting the user or operator to clean the display screen 14 more often.

The controller 24 may send the transmit signal 46 to the transmitters 20. Beams 44 corresponding to the transmit signal 46 may be transmitted by the transmitters 20 and received by the receivers 22. The controller 24 may receive the receive signal 50 from all of the receivers 22 and may determine if any of the beams 44 have been broken. If any beams 44 have been broken, then the controller 24 may start a timer, or otherwise keep track of the time, for the detection of each broken beam 44. If a first time period expires for any of the broken beams 44 and the beam 44 remains broken, then that broken beam 44 may be considered a stuck broken beam 58. An exemplary first time period may be approximately 5 seconds.

The controller 24 may store the number and location of the stuck broken beams 58. The controller 24 may also check the variable factors to determine if the conditions have been met for the touch error 18 according to the value of the touch error 18 that has been set. If debris is present on the display screen 14 that exceeds the conditions for the touch error 18 value, then the controller 24 may generate the alert signal 68, which may prompt a user to clean or examine the display screen 14. The alert signal 68 may include an indication on the display screen 14 where debris is suspected to be located.

The controller 24 may repeat the process of checking for stuck broken beams 58, storing the number and location of any that are found, and then checking the variable factors to determine if the conditions have been met for the touch error 18 indefinitely while the touchscreen system 12 remains in use.

Figure 11:
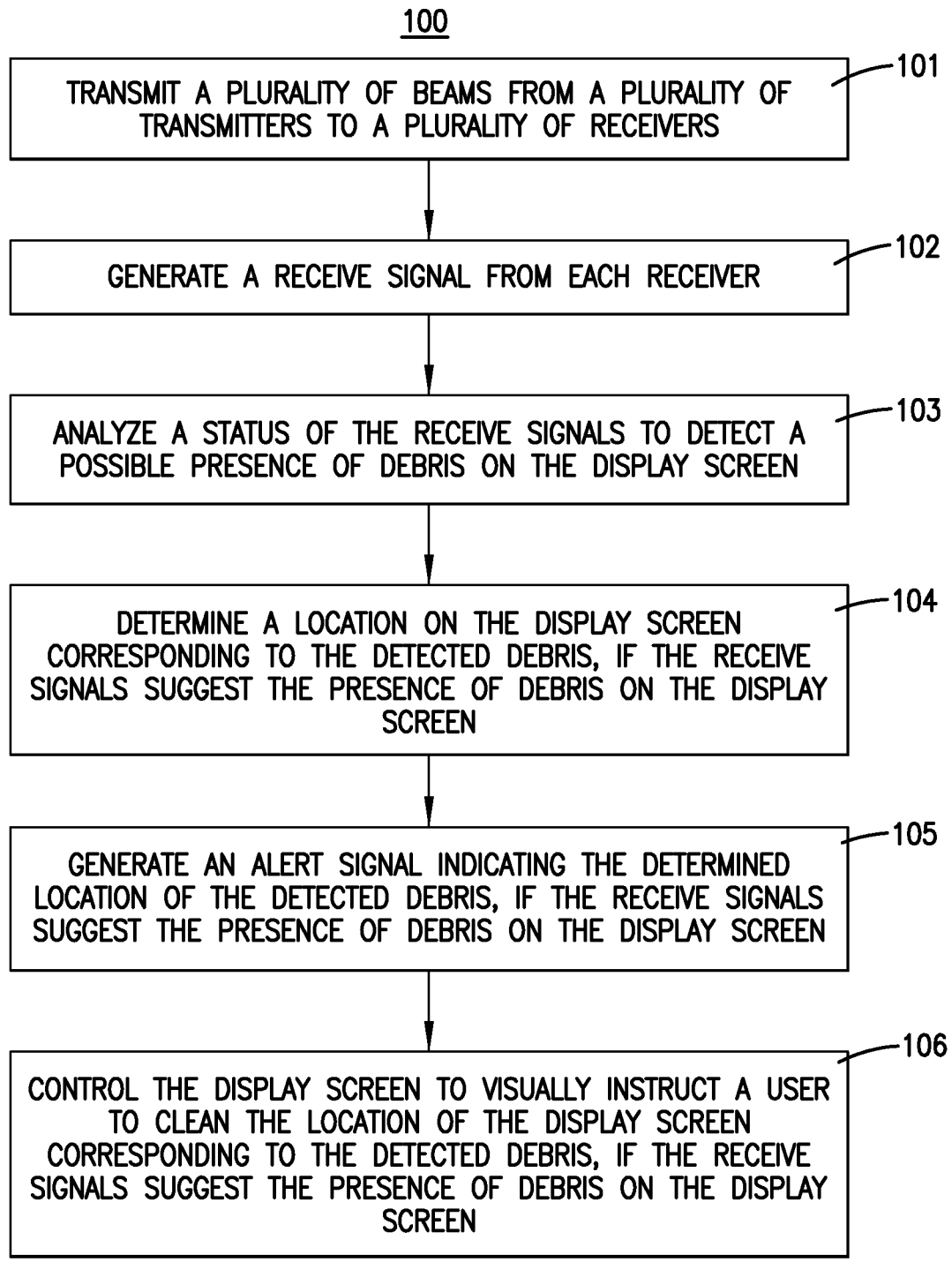
FIG. 11 is a flow diagram of at least a portion of the steps of a method for determining a touch error of a touchscreen system with a display screen.

Steps of a method 100 for determining a touch error 18 of a touchscreen system 12 with a display screen 14 are shown in FIG. 11. The steps may be performed in the order as shown in FIG. 11, or they may be performed in a different order. Furthermore, some steps may be performed concurrently as opposed to sequentially. In addition, some steps may not be performed and/or other steps may be added.

In connection with step 101, a plurality of beams 44 is transmitted from a plurality of transmitters 20 to a plurality of receivers 22. The transmitters 20 and the receivers 22 may be placed around the edges of a display screen 14, and positioned such that each transmitter 20 is generally opposing one or more receivers 22. One or more beams 44 is transmitted from each transmitter 20. One or more of the receivers 22 receives one or more beams 44 from the transmitters 20.

In connection with step 102, one or more of the receivers 22 generates a receive signal 50, which corresponds to the beam 44 transmitted by a transmitter 20. The receive signal 50 may indicate if the beam 44 is not being received as a result of the beam 44 being broken or interrupted.

In connection with step 103, a status of the receive signals 50 is analyzed to detect a possible presence of debris on the display screen 14. Debris on the display screen 14 may break one or more beams 44 indefinitely. If a beam 44 is determined to be broken, then the controller 24 may track the length of time for which the beam 44 is broken. If the beam 44 is broken for longer than a first time period, then the beam 44 is considered a stuck broken beam 58. The first time period may be approximately 5 seconds.

The controller 24 may determine if a first number of stuck broken beams 58 along a first axis 40 of the display screen 14 is equal to or greater than a first value. The first axis 40 is an axis associated with the display screen 14 and may be the horizontal or the vertical axis. The controller 24 may store the first number of stuck broken beams 58 and the location of the receivers 22 for the stuck broken beams 58. The first value is a variable factor that may depend, at least in part, on the touch error 18 value that has been selected for the touchscreen system 12.

The controller 24 may also determine if a second number of stuck broken beams 58 from an opposing side 32, 34, 36, 38 of the first axis 40 is equal to or greater than a second value. The stuck broken beams 58 along the first axis 40 may be along either side 32, 34, 36, 38 of the first axis 40. For example, the stuck broken beams 58 may be along the left side 36 or the right side 38 of the display screen 14 if the first axis 40 is vertical. Alternatively, the stuck broken beams 58 may be along the top side 32 or the bottom side 34 of the display screen 14 if the first axis 40 is horizontal. The controller 24 may store the second number of stuck broken beams 58 and the location of the receivers 22 for the stuck broken beams 58. The second value is a variable factor that may depend, at least in part, on the touch error 18 value that has been selected for the touchscreen system 12.

The controller 24 may further determine if a third number of stuck broken beams 58 along a second axis 42 of the display screen 14 is equal to or greater than a third value. The second axis 42 is an axis associated with the display screen 14 and may be the horizontal or the vertical axis, whichever is orthogonal to that of the first axis 40. The controller 24 may store the third number of stuck broken beams 58 and the location of the receivers 22 for the stuck broken beams 58. The third value is a variable factor that may depend, at least in part, on the touch error 18 value that has been selected for the touchscreen system 12.

In connection with step 104, a location on the display screen 14 is determined that corresponds to the detected debris, if the receive signals 50 suggest the presence of debris on the display screen 14. The controller 24 may determine the location of the debris on the display screen 14 as the position where the stuck broken beams 58 intersect or where the stuck broken beams 58 are closest together.

In connection with step 105, an alert signal 68 is generated indicating the determined location of the detected debris, if the receive signals 50 suggest the presence of debris on the display screen 14. The alert signal 68 may include a flashing light or an audio alert to get the operator's attention.

In connection with step 106, the display screen 14 is controlled to visually instruct a user to clean the location of the display screen 14 corresponding to the detected debris. The controller 24 may display a box or a circle on the display screen 14 where the display screen 14 should be cleaned.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. Touchscreen electronics for detecting debris on a display screen of a touchscreen system and alerting a user to the presence of the debris, the touchscreen electronics comprising:

a plurality of transmitters for transmitting beams across the display screen;

a plurality of receivers for detecting the beams from the transmitters and generating receive signals; and a controller in communication with the transmitters and the receivers and configured to:

analyze a status of the receive signals to detect touch inputs based on one or more of the receivers that detect the transmitted beams within a first time period, analyze a status of the receive signals to detect a possible presence of debris on the display screen based on one or more of the receivers that do not detect the transmitted beams from the transmitters within the first time period, the transmitted beams that are not detected by the one or more receivers within the first time period being stuck broken beams, and if the receive signals suggest the presence of debris on the display screen:

determine a location on or adjacent to the display screen corresponding to the detected debris, and generate an alert signal on the display screen to visually instruct a user to clean the location of the display screen corresponding to the detected debris.

2. The touchscreen electronics of claim 1, wherein the generated alert signal on the display screen includes a prompt indicating the determined location of the detected debris.

3. The touchscreen electronics of claim 1, wherein the determined location of the detected debris is the location at which a plurality of stuck broken beams intersect.

4. The touchscreen electronics of claim 1, wherein the determined location of the detected debris is the location at which a plurality of stuck broken beams are closest together.

5. The touchscreen electronics of claim 1, wherein the first time period is at least five seconds.

6. The touchscreen electronics of claim 1, wherein the controller is further configured to generate an alert signal if a first number of stuck broken beams along a first axis of the display screen exceeds a first value and a second number of stuck broken beams along an opposing side of the first axis exceeds a second value.

7. The touchscreen electronics of claim 1, wherein the controller is further configured to generate an alert signal if a first number of stuck broken beams along a first axis of the display screen exceeds a first value, a second number of stuck broken beams along an opposing side of the first axis exceeds a second value, and a third number of stuck broken beams along a second axis of the display screen exceeds a third value.

8. The touchscreen electronics of claim 1, wherein the determined location of the detected debris is the location of the one or more receivers that have not detected the beams from the transmitters for the first time period.

9. The touchscreen electronics of claim 8, wherein the receivers are positioned adjacent to the display screen.

10. The touchscreen electronics of claim 1, wherein the location of the display screen corresponding to the detected debris is identified by a box.

11. The touchscreen electronics of claim 1, wherein the location of the display screen corresponding to the detected debris is identified by a circle.

12. A method for detecting debris on a display screen of a touchscreen system and alerting a user to the presence of the debris, the method comprising the steps of:

a) transmitting a plurality of beams from a plurality of transmitters to a plurality of receivers;

b) detecting the beams from the transmitters and generating receive signals;

c) analyzing a status of the receive signals to detect touch inputs based on one or more of the receivers that detect the transmitted beams within a first time period;

d) analyzing a status of the receive signals to detect a possible presence of debris on the display screen based on one or more of the receivers that do not detect the beams from the transmitters within the first time period, the transmitted beams that are not detected by the one or more receivers within the first time period being stuck broken beams;

e) determining a location on or adjacent to the display screen corresponding to the detected debris, if the receive signals suggest the presence of debris on the display screen; and f) generating an alert signal on the display screen to visually instruct a user to clean the location of the display screen corresponding to the detected debris, if the receive signals suggest the presence of debris on the display screen.

13. The method of claim 12, wherein the generated alert signal on the display screen includes a prompt indicating the determined location of the detected debris.

14. The method of claim 12, wherein the determined location of the detected debris is the location at which a plurality of stuck broken beams intersect.

15. The method of claim 12, wherein the determined location of the detected debris is the location at which a plurality of stuck broken beams are closest together.

16. The method of claim 12, wherein the first time period is at least five seconds.

17. The method of claim 12, wherein step f) is performed if a first number of stuck broken beams along a first axis of the display screen exceeds a first value and a second number of stuck broken beams along an opposing side of the first axis exceeds a second value.

18. The method of claim 12, wherein step f) is performed if a first number of stuck broken beams along a first axis of the display screen exceeds a first value, a second number of stuck broken beams along an opposing side of the first axis exceeds a second value, and a third number of stuck broken beams along a second axis of the display screen exceeds a third value.

19. The method of claim 12, wherein the determined location of the detected debris is the location of the one or more receivers that have not detected the beams from the transmitters for the first time period.

20. The method of claim 19, wherein the receivers are positioned adjacent to the display screen.

21. The method of claim 12, wherein the location of the display screen corresponding to the detected debris is identified by a box.

22. The method of claim 12, wherein the location of the display screen corresponding to the detected debris is identified by a circle.

23. A method for detecting debris on a display screen of a touchscreen system and alerting a user to the presence of the debris, the method comprising the steps of:

a) transmitting a plurality of beams from a plurality of transmitters to a plurality of receivers;

b) detecting the beams from the transmitters and generating receive signals;

c) analyzing a status of the receive signals to detect touch inputs based on one or more of the receivers that detect the transmitted beams within a first time period;

d) analyzing a status of the receive signals to detect a plurality of stuck broken beams based on one or more of the receivers that do not detect the transmitted beams from the transmitters within a first time period;

e) determining a location on or adjacent to the display screen corresponding to a position of the stuck broken beams; and f) generating an alert signal on the display screen to visually instruct a user to clean the location of the display screen corresponding to the detected debris.

24. The method of claim 23, wherein the generated alert signal on the display screen includes a prompt indicating the determined location of the detected debris.

25. The method of claim 23, wherein the determined location of the detected debris is the location at which a plurality of stuck broken beams intersect.

26. The method of claim 23, wherein the first time period is at least five seconds.

27. The method of claim 23, wherein the stuck broken beams include a first number of stuck broken beams along a first axis of the display screen exceeding a first value and a second number of stuck broken beams along an opposing side of the first axis exceeding a second value.

28. The method of claim 23, wherein the stuck broken beams include a first number of stuck broken beams along a first axis of the display screen exceeding a first value, a second number of stuck broken beams along an opposing side of the first axis exceeding a second value, and a third number of stuck broken beams along a second axis of the display screen exceeding a third value.

29. The method of claim 23, wherein the determined location of the detected debris is the location at which a plurality of stuck broken beams are closest together.

30. The method of claim 23, wherein the determined location of the detected debris is the location of the one or more receivers that have not detected the beams from the transmitters for the first time period.

31. The method of claim 30, wherein the receivers are positioned adjacent to the display screen.

32. The method of claim 23, wherein the location of the display screen corresponding to the detected debris is identified by a box.

33. The method of claim 23, wherein the location of the display screen corresponding to the detected debris is identified by a circle.

* * * * *